United States Patent [19]

Brooks

[11] 4,415,037
[45] Nov. 15, 1983

[54] BALL VALVE LOADING APPARATUS

[75] Inventor: Robert T. Brooks, Kingwood, Tex.

[73] Assignee: Baker International Corporation, Orange, Calif.

[21] Appl. No.: 290,742

[22] Filed: Aug. 7, 1981

[51] Int. Cl.³ .............................................. E21B 34/06
[52] U.S. Cl. .................................... 166/331; 166/386; 137/629; 251/160
[58] Field of Search ............... 166/331, 330, 373, 324, 166/386; 251/160, 181; 137/629

[56] References Cited

U.S. PATENT DOCUMENTS 3,667,505  6/1972  Radig .................................. 137/629
3,993,136  11/1976  Mott .................................... 166/324
4,325,434  4/1982  Roberts ............................... 137/629

Primary Examiner—Ernest R. Purser
Assistant Examiner—Hoang C. Dang
Attorney, Agent, or Firm—Norvell & Associates

[57] ABSTRACT

A ball valve assembly is provided for elimination of the tearing of the annular elastomeric seal which normally engages the periphery of such ball valve due to the movement of the valve with excessive loading imposed on the elastomeric seal. A spring pressed element engages the portion of the ball opposite the position of the annular elastomeric seal and exerts a substantially constant loading force on the ball and hence on the elastomeric seal.

3 Claims, 2 Drawing Figures

BALL VALVE LOADING APPARATUS

BACKGROUND OF THE INVENTION

1. Field of the Invention

This invention relates to rotary ball valves of the type employed in subterranean wells, and particularly to an apparatus for imposing a substantially constant loading between the ball and the annular seal which cooperates with the spherical ball surface.

2. Description of the Prior Art

A ball valve is one of the most popular types of valves employed in subterranean wells for the control of fluid passing through a conduit. Balls valves are found in safety valves and in test trees. For example, a pair of typical ball valves are described and illustrated in my co-pending application, Ser. No. 064,455 filed Aug. 6, 1979, now U.S. Pat. No. 4,306,623 entitled "Valve Assembly For A Subterranean Well Conduit", and assigned to the Assignee of this application.

The typical ball valve embodies a spherically shaped element having a cylindrical fluid passage through its center. An annular seal disposed transversely of a fluid conduit, cooperates with a spherical segment portion of the surface of the ball valve, particularly when it is shifted to its closed position wherein the fluid passageway through the valve is disposed transversely to the fluid conduit in which the ball valve is mounted.

Ball valves are customarily operated by a camming sleeve, or by a pair of diametrically opposed, camming sleeve segments, which incorporate cam slots which respectively receive radially projecting diametrically opposed pins projecting from the periphery of the ball valve and being offset from the rotational center of the ball. Axial movement of the camming sleeve or segments thus effects a 90° rotation of the ball valve required to rotate it from a fully opened to a fully closed position.

In prior art valve assemblies, the loading of the ball valve against the annular seal is a matter of some uncertainty. It is common to employ an elastomeric material for the annular seal and then to impose the loading force through the camming pins when they are moved by the camming sleeves to their closed position. Since the mechanism for operating the camming sleeve is generally reasonably complicated and subjected to an accumulation of tolerances, it is understandable that, in prior valves, there are wide variations in the loading force imposed between the ball valve and the annular elastomeric seal. Excessive loads on the elastomeric material will inherently result in the tearing of the material when the ball valve is next rotated to its opened position. Too light loading results in leakage, particularly as the operating parts wear or corrode.

SUMMARY OF THE INVENTION

This invention provides a ball valve and operating apparatus therefor wherein a substantially constant load is imposed between the ball valve and an annular elastomeric seal which cooperates with the spherical surface of the ball in its closed position. The ball valve is surrounded by either a sleeve, or by a pair of diametrically opposed, camming sleeve segments, and such sleeve or segments have the customary camming slots therein which cooperate with diametrically opposed projecting pins provided on the ball valve to effect the rotation of the ball valve through 90° as the camming sleeve segments are axially reciprocated. A pair of camming sleeve segments are preferably employed.

The camming sleeve segments and an annular seal support for the annular elastomeric valve are disposed within a tubular housing. The annular seal support is rigidly connected to such housing, in transverse relationship thereto, by at least a pair of radially projecting ribs. The camming sleeve segments slide within the bore of the housing, in and through the spaces defined between the projecting ribs of the seat support. On the opposite side of the ball, the housing defines an internal annular recess. A loading element is then provided having an annular spherical segment surface contactable with the periphery of the ball valve, and at least a pair of radially projecting ribs which extend outwardly between the camming sleeve segments and into the recess of the cylindrical housing. A compression spring is mounted in such recess and imparts a substantially constant force on the ribs of the loading element. The loading element in turn forces the spherical ball against the annular elastomeric seal with a substantially constant loading force. Such force is not affected by the manipulation of the ball valve between opened and closed positions by the reciprocation of the annular camming segments, since the cam slots in such segments are no longer relied upon to impose a loading force on the pins of the ball valve when the valve reaches its closed position.

DESCRIPTION OF THE PREFERRED EMBODIMENTS

Figure 1:
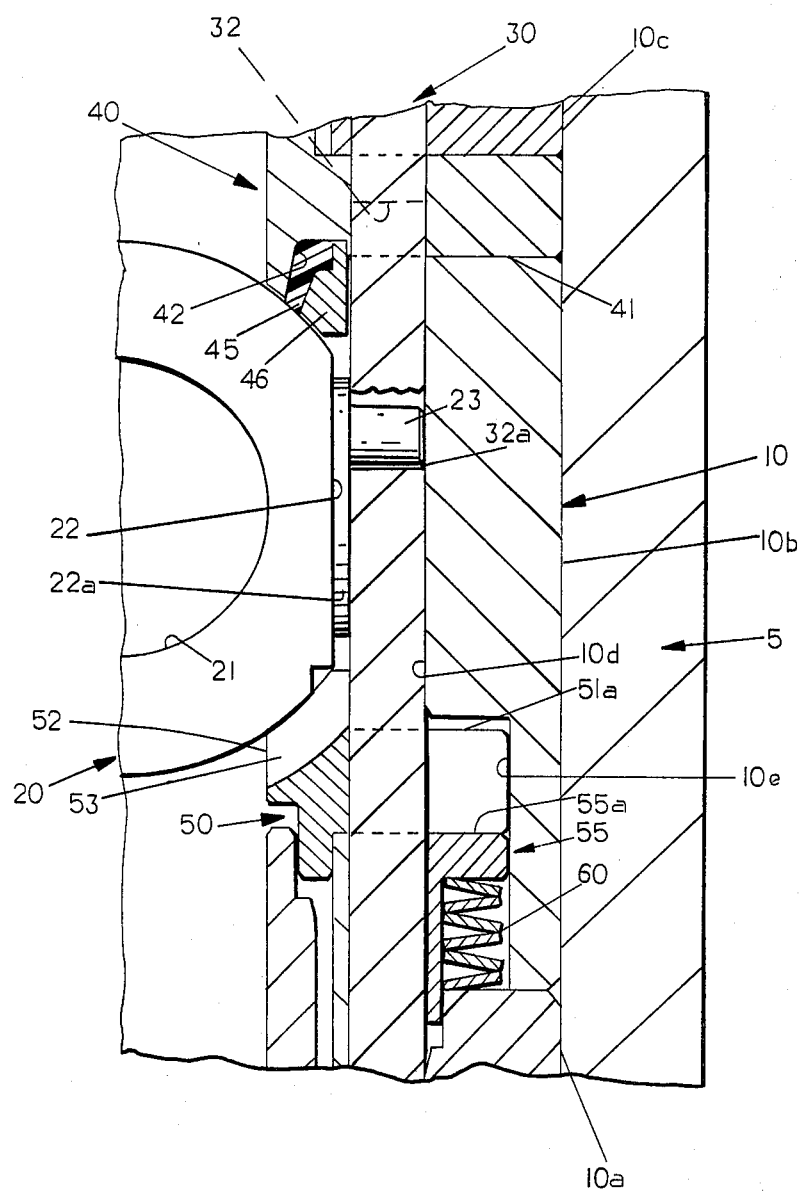
FIG. 1 is a vertical sectional view of a ball valve unit embodying this invention installed in a subterranean well.

Referring to the drawings, the ball valve unit embodying this invention is mounted within a vertically disposed cylindrical housing 10 which, in turn, is conventionally secured in a ball cartridge receptacle 5. The housing 10 is preferably fabricated by the vertical stacking of a plurality of annular units 10a, 10b, and 10c. All such units define a common bore 10d within which the ball valve unit 20 and a pair of diametrically opposed actuating sleeve segments 30 are mounted. For a more detailed description of the mounting of the housing 10 and actuating sleeve segments 30 in the ball valve cartridge 5, reference should be had to co-pending application, Ser. No. 064,455, filed Aug. 6, 1979, and entitled 'Valve Assembly For A Subterranean Well Conduit'.

The ball 20 is of conventional spherical shape and defines a cylindrical fluid passage 21 through its central portion. In FIG. 1, the ball is shown in its closed position wherein the cylindrical passage 21 is disposed at right angles to the bore 10d of the fixed housing 10. Ball 20 is further provided on opposed sides with circular flat surfaces 22, said surfaces being respectively parallel to the axis of the ball fluid passage 21. Each circular flat surface 22 defines a peripheral cylindrical wall 22a which rides between appropriate guides 31 provided in the inner face of the ball operating sleeve segments 30.

Additionally, the ball 20 is provided with a pair of coaxial camming pins 23 which respectively project outwardly from the flat surfaces 22 but are offset from the axis of rotation of the ball 20 defined by the cylindrical wall surface 22a. The camming pins 23 respectively engage cam slots 32 provided in each of the camming sleeve segments 30, as is more particularly described and illustrated in my aforementioned co-pending application. Each camming sleeve segment 30 is provided at its upper end with a T-slot 35 for convenient engagement with an actuating sleeve (not shown) which may be axially shifted by a fluid pressure actuator (not shown).

The vertical position of the ball 20 within the bore 10d of the housing assemblage 10 is determined by an annular ball seal support member 40 which is provided with a pair of radially projecting ribs or extensions 41 which are respectively engageable between the middle housing unit 10b and the upper housing unit 10c. The extensions 41 project through the radial spaces defined between the opposed actuating sleeve segments 30. The bottom interior surface of the annular seal support 40 is recessed as indicated at 42, and an elastomeric seal element 45 is secured in such recess by a securing ring 46 which is suitably secured to the annular seal support 40 by a plurality of bolts (not shown). The annular elastomeric seal element 45 projects slightly beyond the adjacent surfaces of the seal support 40 and the retaining ring 46 so as to snugly engage a spherical segment portion of the ball 20 in its closed position, illustrated in FIG. 1, and to maintain such sealing engagement as the ball is rotated 90° through the cooperation of the pivot pins 23 with the cam slots 32 of the actuating sleeve segments 30.

Figure 2:
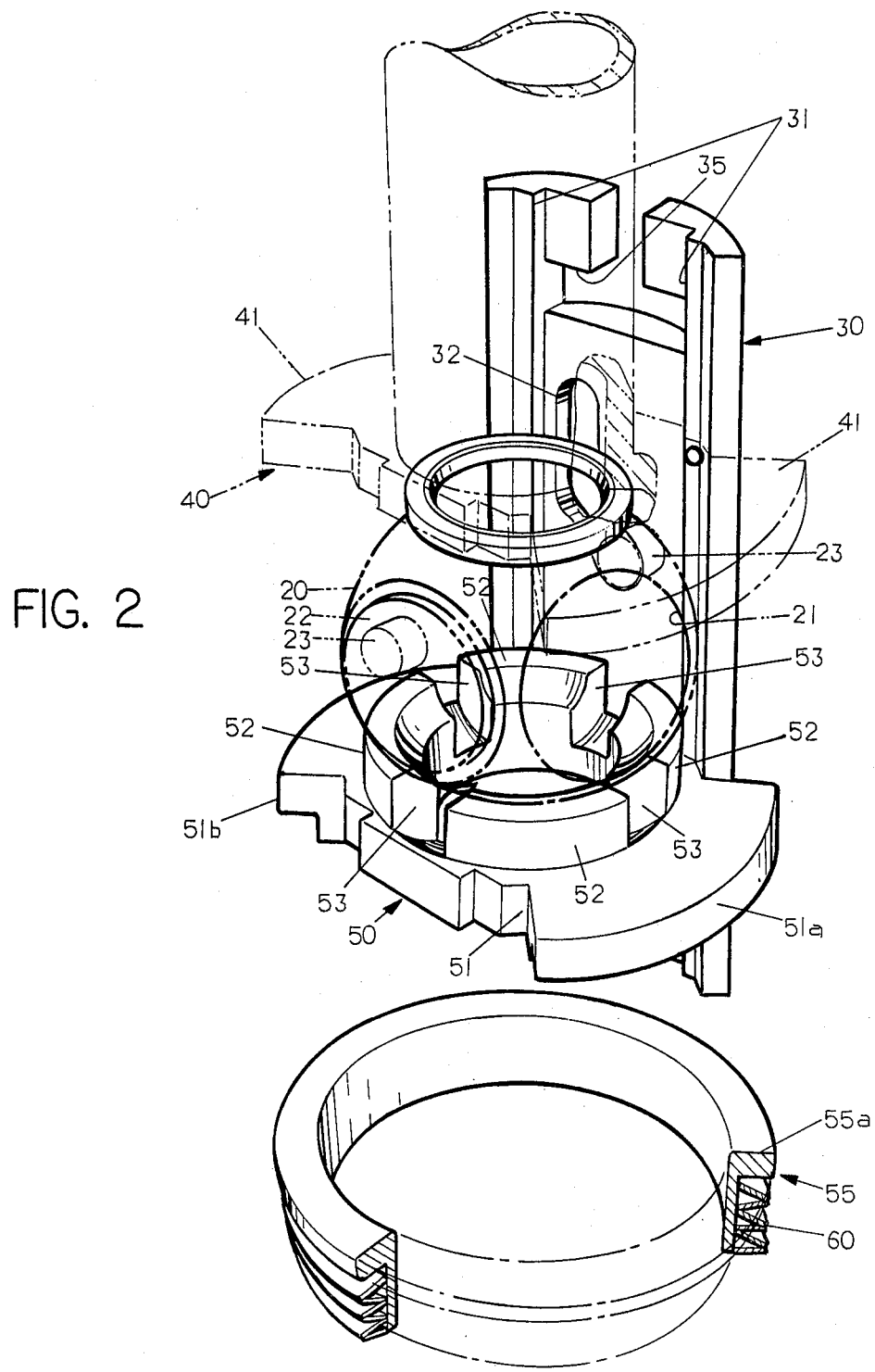
FIG. 2 is an exploded perspective view of the ball valve loading elements embodying this invention.

To provide a substantially constant loading between the elastomeric seal element 45 and the opposed spherical surface segment of the ball 20, an annular loading member 50 is provided below ball 20, which engages the side of the ball opposite to the point of engagement by the annular seal 45. As best shown in FIG. 2, the annular loading member 50 comprises a base portion 51 having opositely disposed, radially projecting annular segment ribs 51a and 51b which are respectively disposed in the spaces between the actuating sleeve segments 30 and enter into an internal annular recess 10e (FIG. 1) provided in the lower portion of the central housing unit 10b. Four upstanding ball engaging annular segments 52 are then provided on the top surface of the base element 51, such segments being peripherally spaced apart to define grooves 53 for the passage of drilling mud or a kill fluid around the ball 20, if such action is required. To impart a constant vertical loading force on the ball 20, the projecting annular segment ribs 51a and 51b rest upon the top surface 55a of an annular spring guide 55 which is slidably mounted in the recess 10e. A plurality of annular disc springs 60 are then stacked beneath the spring guide 55 and abut against the top end wall of the lower housing sleeve section 10a to exert a preselected, constant upward force on the annular loading member 50, urging the ball 20 upwardly into sealing engagement with the elastomeric seal element 45.

From the foregoing description, it is apparent that with the construction of this invention, it is no longer necessary for the cam slots 32 to be designed so as to impart a loading force on the ball 20 when the ball is rotated to its closed position. Hence, an actual clearance 32a is provided between the ends of the cam slots 32 and the pivot pins 23, so as to insure that in the closed position of the ball, the loading of the ball 20 against the elastomeric seal element 35 is determined solely by the force generated by the compression spring 60. Thus, the ball 20 may be repeatedly moved from open to closed to open position, without incurring the risk of severe loading of the ball 20 against the elastomeric seal element 45.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for selectively opening and closing a subterranean fluid conduit in a well by rotation of a ball between two 90° displaced positions, said apparatus comprising: a hollow cylindrical housing; an annular seal support secured transversely within said housing by at least a pair of opposed radial ribs; annular sealing means mounted on the radially inner portions of said annular seal support; a pair of ball camming sleeve segments axially slidably mounted within the bore of said housing and passing through the annular segment spaces defined between said radial ribs; a ball valve having a cylindrical fluid passage therethrough and a spherical segment surface cooperating with said annular seal in sealing relation; opposed pins projecting from said ball and offset from the ball center; cam slots in said ball camming sleeve segments respectively receiving said pins, whereby axial movement of said camming sleeve segments rotates said ball 90° between an open and a closed position relative to the bore of said annular seal; an annular loading element engaging the ball surface portion diametrically opposite to the portion engaged by said annular seal, said housing defining an annular interior recess adjacent said annular ball loading element, said loading element having at least two radially projecting ribs extending between said camming sleeve segments and into said housing annular recess; and a compressed spring in said recess transmitting a substantially constant axial force to said loading element, thereby producing a substantially constant loading force between said ball and said annular seal.

2. The apparatus of claim 1 wherein said hollow cylindrical housing comprises a plurality of axially stacked, annular elements, said radial ribs of said seal support being engaged between one pair of adjacent annular elements and said housing annular recess being defined between another pair of adjacent annular elements.

3. The apparatus of claim 1 wherein said annular seal comprises an elastomeric member subject to tearing by movements of said ball under excessive loading forces.

* * * * *